C. S. CRAWFORD.
VEHICLE WHEEL.
APPLICATION FILED SEPT. 2, 1920.
1,381,859. Patented June 14, 1921.
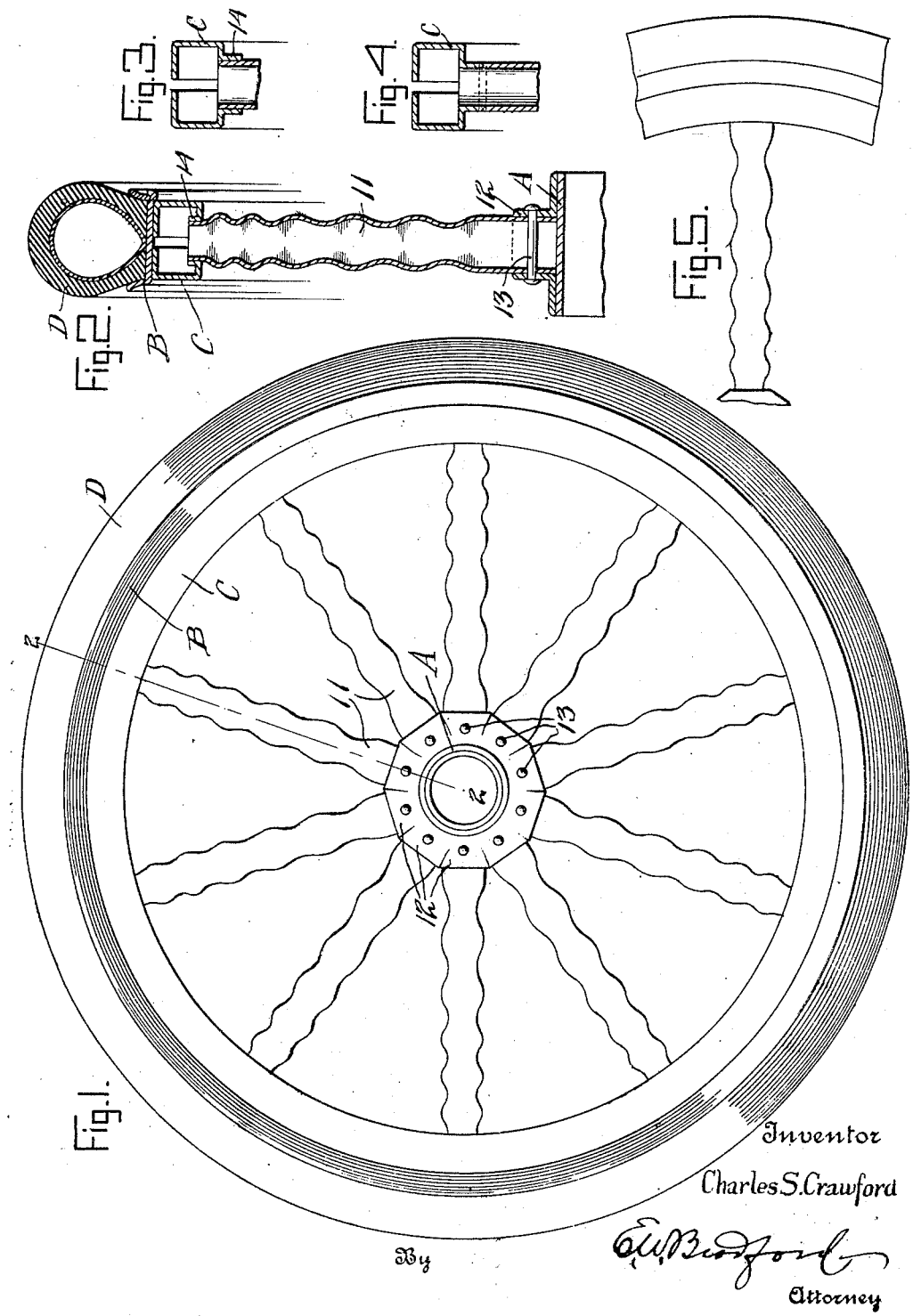
Inventor
Charles S. Crawford
By
Attorney

UNITED STATES PATENT OFFICE.

CHARLES S. CRAWFORD, OF INDIANAPOLIS, INDIANA, ASSIGNOR TO PREMIER MOTOR CORPORATION, OF INDIANAPOLIS, INDIANA, A CORPORATION OF DELAWARE.

VEHICLE-WHEEL.

1,381,859. Specification of Letters Patent. Patented June 14, 1921.

Continuation of application Serial No. 285,178, filed March 26, 1919. This application filed September 2, 1920. Serial No. 407,616.

*To all whom it may concern:*

Be it known that I, CHARLES S. CRAWFORD, a citizen of the United States, residing at Indianapolis, in the county of Marion and State of Indiana, have invented certain new and useful Improvements in Vehicle-Wheels, of which the following is a specification.

The object of my said invention is to provide a resilient metal wheel for vehicles particularly designed for automobile use wherein resiliency or elasticity will be secured through the medium of tubular spokes of special design and construction, all as will be hereinafter more fully described and claimed.

Referring to the accompanying drawings, which are made a part hereof and on which similar reference characters indicate similar parts, Figure 1 is a side elevation of a wheel embodying my said invention, Fig. 2 a detail section in the dotted line 2—2 of Fig. 1, and Figs. 3, 4 and 5 detail views showing modifications.

In said drawings the portions marked A represent the hub, B and C the two members of the rim, and D the tire, which parts are or may be of any appropriate or desired construction and arrangement. I prefer an all metal rim composed of the two parts B and C, as shown, the part B being the ordinary rim for holding the tire D and the part C a hollow metal ring formed of sheet metal, preferably rectangular in cross section and secured to the member C by welding or riveting, or by other appropriate means, the free edges of the ring being welded to the face of member C.

The spokes consist of corrugated metal tubes 11 the inner ends of which are secured to the hub in metal sockets 12 by bolts or rivets 13, and the outer ends of which are secured in the member C in sockets 14 by welding, or other appropriate means. In Fig. 2 the socket for receiving the outer end of the spoke is formed by punching inward, while in Fig. 3 I show it formed by punching outward. In Fig. 4 the end of the spoke is shown as secured to the out-turned flange on the member C by a "butt-weld." These forms are shown to illustrate a few of the modifications that readily suggest themselves.

The invention resides chiefly in forming said spokes of corrugated tubes and in specifically forming the corrugations of varying lengths, successive corrugations being of gradually varying length throughout the length of the spokes, or from hub to the rim. In the main figures I have shown the corrugations shorter adjacent to the rim and longer adjacent to the hub, but it will be understood that the reverse form may be used, as shown in Fig. 5.

Such a spoke not only affords resiliency to the wheel but equalizes the strength and rigidity of the spoke from the center of the wheel toward the rim and thus secures a uniform rate of deflection, which is important in wheels designed for the purpose for which this is intended. The corrugations run circumferentially around the spokes, as shown, and the term "corrugated circumferentially" as used herein is intended to mean that the spokes are so formed.

It will be understood, of course, that any metal found appropriate for the purpose may be used, but steel tubing will probably be preferred.

This application is filed as a continuation of application No. 285,178 filed March 26, 1919.

Having thus fully described my said invention, what I claim as new and desire to secure by Letters Patent, is:

1. A wheel composed of a hub, a rim and spokes interposed between said hub and rim consisting of metal tubes corrugated circumferentially.

2. A wheel comprising a hub, a rim and spokes connecting said hub and rim consisting of metal tubes corrugated circumferentially, the corrugations varying in length from hub toward the rim, substantially as set forth.

3. A wheel comprising a hub, a rim, and spokes, said spokes consisting of metal tubes formed with circumferential corrugations varying in length from the hub toward the rim and secured to the rim by connection with a hollow ring member thereof, substantially as set forth.

4. A wheel comprising a hub, a rim consisting of two members secured together the inner member being hollow, and tubular spokes circumferentially corrugated and connecting said hub and rim, said spokes at their outer ends being joined to sockets formed in said hollow member, substantially as set forth.

In witness whereof, I have hereunto set my hand and seal at Indianapolis, Indiana, this 28th day of August, A. D. nineteen hundred and twenty.

CHARLES S. CRAWFORD. [L. S.]

Witnesses:
E. W. BRADFORD,
M. L. SHULER.